United States Patent [19]
Bonnet

[11] 3,973,292
[45] Aug. 10, 1976

[54] COLLAR

[76] Inventor: Robert Yves Gabriel Bonnet, 24 Bd Richard Lenoir, 75011 Paris, France

[22] Filed: June 13, 1974

[21] Appl. No.: 479,132

[30] Foreign Application Priority Data
June 19, 1973 France .................... 73.22203

[52] U.S. Cl. .................................... 24/16 PB
[51] Int. Cl.² ................................. B65D 63/00
[58] Field of Search .......... 24/16 PB, 73 PB; 248/74 PB

[56] References Cited
UNITED STATES PATENTS

| | | |
|---|---|---|
| 3,537,146 | 11/1970 | Caveney ..................... 24/16 PB |
| 3,581,349 | 6/1971 | Verspieren ................. 24/16 PB |
| 3,717,906 | 2/1973 | Wells ......................... 24/16 PB |
| 3,735,449 | 5/1973 | Rosoles ...................... 24/16 PB |

Primary Examiner—Werner H. Schroeder
Assistant Examiner—Doris L. Troutman
Attorney, Agent, or Firm—Diller, Brown, Ramik & Wight

[57] ABSTRACT

A collar including a flexible strap with an integral fastening head at one end through which the other end of the strap can pass. Two flexible blocks are provided on the fastening head to define a passage for the free end of the strap, and these blocks preferably have edges or teeth to engage the strap and prevent withdrawal thereof. The strap may also have teeth.

9 Claims, 13 Drawing Figures

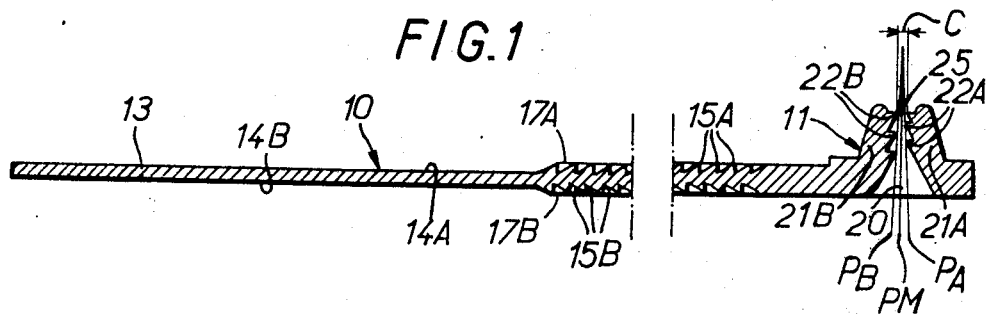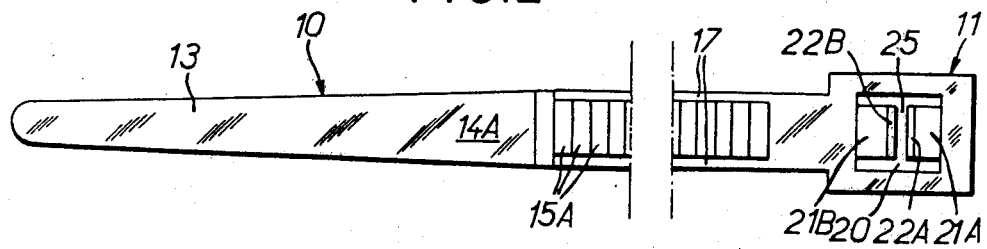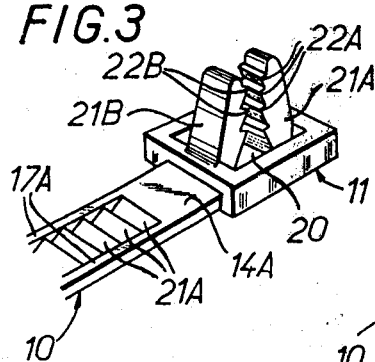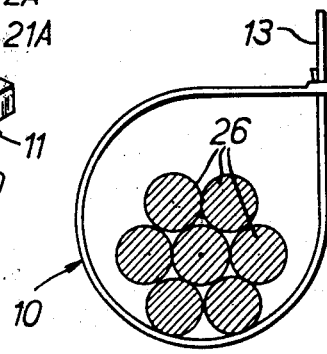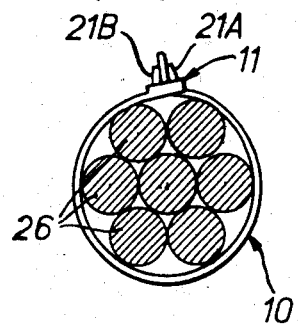

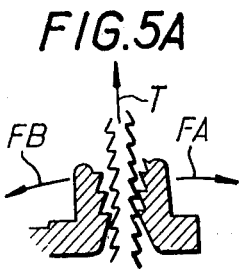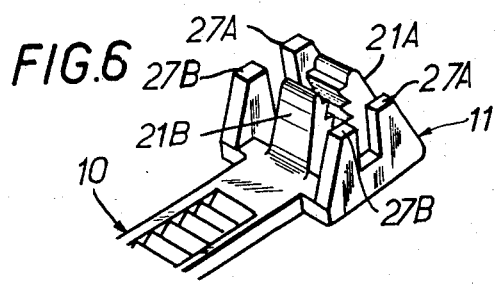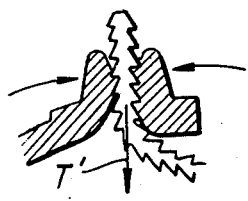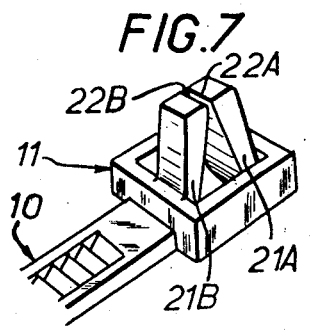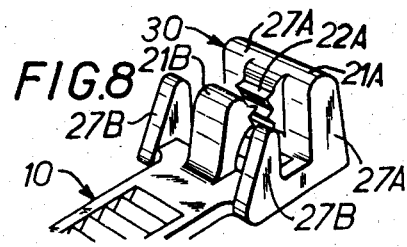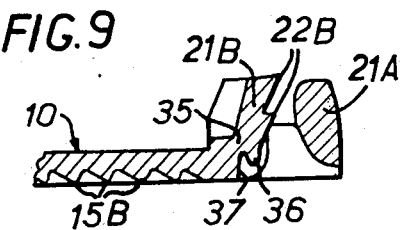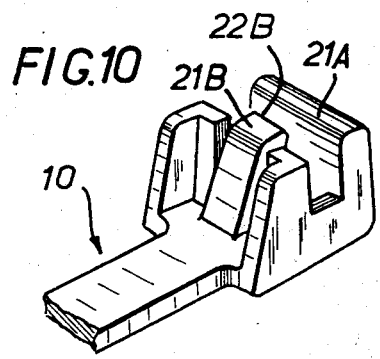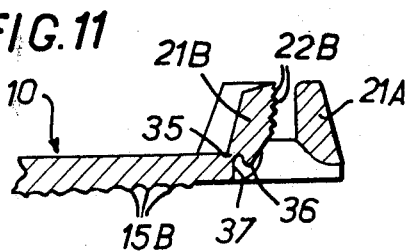

COLLAR

The present invention relates to a collar and, more particularly to a collar including a flexible strap and an integral fastening head at or adjacent one end of the strap. The fastening head has an aperture through which the other end of the strap can be passed to form a closed loop.

Such collars are currently used for holding elements such as wires or cables in groups, and for fixing elements to supports.

It is an object of the invention to provide an improved collar of the above described type.

According to the present invention there is provided a collar including a flexible strap with an integral fastening head at or adjacent one end, the fastening head having an aperture through which the other end of the strap can be passed to form a closed loop, and the fastening head having on one side, two integral blocks which can be flexed and between which is defined a passage which is an extension of the aperture and is narrower than the thickness of the flexible strap.

In one form, the outer edges of the blocks at the end of the passage between them are shaped to act as teeth on the strap when introduced between them.

There may be projections on at least one block and extending into the passage.

In use, the engagement of the flexible strap in the passage urges the blocks to move apart, and the blocks are elastically urged into contact with the flexible strap. The edges of the blocks, or projections thereon, engage with the strap, opposing its withdrawal.

Advantageously, the blocks act in the manner of self-locking blocks, in that any traction exerted upon the strap in a direction to disengage it from the fastening head increases the clamping action exerted upon the strap by the blocks.

In order that the invention may be more clearly understood, the following description is given, merely by way of example, with reference to the accompanying drawings, in which:

FIG. 1 is longitudinal sectional view of one form of collar according to the invention;

FIG. 2 is a plan view thereof;

FIG. 3 is a perspective view, on a different scale, of the fastening head of the same collar;

FIGS. 4A, 4B are elevations illustrating the utilisation of the collar;

FIGS. 5A, 5B are part sectional partial views on a larger scale corresponding to FIGS. 4A, 4B;

FIGS. 6 to 8 are views similar to FIG. 3 of other embodiments of the invention;

FIG. 9 is a partial longitudinal section showing the fastening head of a further embodiment;

FIG. 10 is a partial perspective view of the embodiment of FIG. 9; and

FIG. 11 is a partial longitudinal section showing the fastening head of a still further embodiment.

The embodiment shown in FIGS. 1 to 3, 4A, 4B, 5A and 5B, includes, as an integral unit, a flexible strap 10 and a fastening head 11.

The collar is of one piece and can be produced for example by moulding from any appropriate synthetic material, such as those sold under the names "NYLON" and "RILSAN".

Overall, and when not in use, the flexible strap 10 is substantially flat, having upper and lower faces 14A and 14B and narrow edges.

At the end remote from the fastening head 11, the strap 10 terminates in a gripping tongue 13. Between the tongue 13 and the fastening head 11 the faces 14A, 14B each carry a plurality of teeth 15A, 15B, having faces extending transversely of the strap to outer edges and inclined faces extending from the edges towards the free end of the strap. These teeth are regularly spaced over a substantial part of the length of the strap.

Preferably, and as represented, the teeth 15A on the upper face and the teeth, 15B on the lower face are staggered in relation to one another along the strap. In other words, a plane passing through an edge of a tooth 15A and perpendicular to the length of the strap 10 will be between the comparable planes passing through the edges of the nearest two teeth 15B. This prevents the thickness of the strap 10 being excessively reduced between teeth.

As shown, both sets of teeth 15A and 15B are longitudinally bordered, on both sides, by flanges 17, (17A and 17B) along the edges of the faces 14A and 14B and extending to the same height as the top of the teeth.

The fastening head 11 has an aperture 20 of sufficient transverse dimensions to allow the strap 10 to pass through it. In practice, and as shown, the fastening head 11 has the general form of a rectangular frame surrounding the aperture 20.

In addition, the fastening head carries on one side two integral blocks 21A, 21B. These blocks together define a passage 25 which is an extension of the aperture 20, and through which the strap can pass as will be described. By reason of the relatively flexible material of which the collar is made, the blocks can be flexed on the fastening head 11, at their connecting zones. In this first embodiment, the passage 25 between the blocks 21A, 21B converges in a direction away from the head 11. The blocks also each carry a plurality of transverse teeth 22A, 22B facing one another across the passage. Preferably, and as shown the planes PA and PB which include the edges of the teeth also converge away from the head 11.

In practice, the planes PA and PB are preferably symmetrical about a median plane PM passing through the middle of the passage 20 and perpendicular to the flexible strap 10. The various planes are shown in FIG. 1.

By reason of the above features the blocks 21A and 21B or more precisely the teeth 22A and 22B thereon define the width C of the passage 25 as less than the thickness of the strap 10, that is the mean thickness of the strap including the teeth thereon.

FIGS. 4A, 4B, 5A and 5C show an example of the above described embodiment in use. In order to group elements 26, the strap of a collar is passed in a loop around the elements and the gripping tongue 13 is passed through the aperture 20 and passage 25 in the head 11 and between the blocks. Traction is exerted upon the strap as indicated by the arrow T in FIG. 5A, and the strap 10 forces the blocks 21A, 21B to pivot apart, as indicated by the arrows FA and FB, about their respective connecting zones on the fastening head 11.

When the elements are sufficiently tightly encircled (FIG. 4B), the traction upon the strap is removed and, as the blocks 21A, 21B are urged elastically towards one another and against the faces of the strap, the teeth 22A, 22B on the blocks engage the teeth 15A, 15B on the flexible strap 10. This engagement opposes withdrawal of the strap 10.

On the other hand any strap releasing traction in a direction T' (FIG. 5B) tending to effect disengagement of the teeth tends further to urge the blocks 21A, 21B towards one another and to tighten the hold of the head 11 on the strap 10.

Any excess part of the strap 10 passed through the blocks 21A, 21B can be removed as by cutting.

A variant of the invention is shown in FIG. 6 wherein the head 11 carries, on both sides of each of the blocks 21A and 21B, bearing studs 27A, 27B capable of permitting or facilitating the supporting of any pulling or cutting tool adapted to grip the strap 10 in order for instance first to pull it tight and then to cut it.

A simplified variant of the invention is illustrated in FIG. 7, wherein the blocks 21A, 21B do not have teeth as such, but their outer edges 22A, 22B, at the end of the passage between them are acute angled effective to function as teeth when the strap is introduced between them. In this case the convergence of the passage between the blocks is more pronounced.

A further variant of the invention is illustrated in FIG. 8, wherein the blocks 21A, 21B are not symmetrical. The block 21A, further from the flexible strap 10, and upon which the force exerted by the strap during tightening of the collar has the greatest effect, is reinforced so as to be slightly more rigid than the other block 21B. The reinforcement shown is a backing wall 30 integral with the head 11 and which, on both sides of the block, also provides the support studs 27A similar to those of the embodiment of FIG. 6.

Another simplified variant of the invention is shown in FIGS. 9 and 10, in which the block 21A which is further from the strap 10 and is reinforced as in FIG. 8, is not provided with teeth. The outer block 21B does have teeth and the strap 10, of course, only has teeth on its lower face in this case, to co-operate with the teeth 15B on block 21B.

In this embodiment the block 21B only has two teeth, one of which is its own outer edge. At its connection with the fastening head, the block 21B has a narrowed region 35 to facilitate elastic flexing. It also has a depending heel 36 intended to limit flexing by abutting the corresponding wall 37 of the passage 20.

According to the variant illustrated in FIG. 11, the teeth 15B on the strap and 22B on the block 21B comprise only simple transverse ribs, without any faces perpendicular to the length of the strap.

In the variants illustrated in FIGS. 9 to 11, the support studs 27A associated with the block 21A are integral with that block, as in FIG. 8, while the support studs associated with the block 21B comprise right-angled turned in pieces 38B, which are turned in towards the block.

In all cases, even when it is reinforced, the block 21A will be at least partially elastically deformable.

Of course the present invention is not limited to the forms of embodiment as described and illustrated but includes any appropriate and operational combination or selection of the various optional features described separately above.

Teeth may be provided on only one of the faces of the strap, while the other face can be provided with another type of projection, for example with simple surface corrugation, or may even be perfectly smooth.

Also both faces of the strap can be equipped with simple surface corrugations or with projections other than teeth, and it is also possible for both faces to be smooth, in which case one relies upon the teeth of the blocks pressing against and thereby restraining the strap during use.

I claim:
1. A collar comprising a flexible strap with first and second ends, a flat integral fastening head adjacent said first end, an aperture in said fastening head through which said second end of said strap can be passed to form a closed loop, and two blocks integral with said fastening head on opposite sides of said aperture, said blocks being flexible and adapted to be displaced away from each other for enabling said strap second end to pass therethrough, said blocks projecting from the general plane of said fastening head and defining at all times a passage which is disposed beyond said aperture along the general axis thereof and in continuation thereof, at least one of said blocks having a shoulder projecting into said aperture and engageable with said fastening head for limiting flexing of said one block in a direction to close said passage.

2. A collar as claimed in claim 1 including support studs on said fastening head adjacent said blocks, said support studs defining upper seats to support, in use, a traction tool for tightening said collar.

3. A collar as claimed in claim 2 wherein portions of said support studs associated with at least one block are of right angular cross section, having turned in portions extending towards that block.

4. A collar as claimed in claim 1 wherein at least one of said blocks is of reduced cross section in the zone of connection thereof to said fastening head.

5. A collar comprising a flexible strap with first and second ends, a flat integral fastening head adjacent said first end, an aperture in said fastening head through which said second end of said strap can be passed to form a closed loop, and two blocks integral with said fastening head on opposite sides of said aperture, said blocks projecting from the general plane of said fastening head and defining at all times a passage which is disposed beyond said aperture along the general axis thereof and in continuation thereof, one of said two blocks being of a bifurcated construction and including two spaced halves, and a further block integral with said fastening head between said spaced block halves, said further block being flexible and adapted to be displaced away from the other of said two blocks for enabling said strap second end to pass between said further block and said other block, and at least one tooth on said further block facing said other block for gripping said strap second end.

6. A collar as claimed in claim 5 wherein said further block has a shoulder projecting into said aperture and engageable with said fastening head for limiting flexing of said further block in a direction to close said passage.

7. A collar as claimed in claim 6 wherein said further block is of a reduced cross section in the zone of connection thereof to said fastening head.

8. A collar as claimed in claim 5 wherein said two blocks are rigid.

9. A collar as claimed in claim 5 wherein said other block is rigid and has teeth thereon facing said further block.

\* \* \* \* \*